US009219289B2

(12) United States Patent
Loer

(10) Patent No.: US 9,219,289 B2
(45) Date of Patent: Dec. 22, 2015

(54) EQUIPPING MOTOR VEHICLE BATTERY HOUSINGS WITH SETS OF ELECTRODE PLATES

(75) Inventor: Roger Loer, Hannover (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 149 days.

(21) Appl. No.: 13/814,152

(22) PCT Filed: Aug. 1, 2011

(86) PCT No.: PCT/EP2011/003847
§ 371 (c)(1),
(2), (4) Date: Feb. 4, 2013

(87) PCT Pub. No.: WO2012/016675
PCT Pub. Date: Feb. 9, 2012

(65) Prior Publication Data
US 2013/0125388 A1 May 23, 2013

(30) Foreign Application Priority Data
Aug. 4, 2010 (DE) .......................... 10 2010 033 436

(51) Int. Cl.
H01M 4/82 (2006.01)
H01M 10/04 (2006.01)
(Continued)

(52) U.S. Cl.
CPC ......... *H01M 10/0404* (2013.01); *B23P 19/008* (2013.01); *B23P 19/04* (2013.01); *B23P 21/004* (2013.01); *H01M 10/049* (2013.01); *H01M 10/128* (2013.01); *B23P 2700/50* (2013.01);
(Continued)

(58) Field of Classification Search
None
See application file for complete search history.

(56) References Cited

U.S. PATENT DOCUMENTS 3,627,617 A * 12/1971 Schaumburg et al. ........ 156/566
3,744,112 A 7/1973 Lindenberg et al.
(Continued)

FOREIGN PATENT DOCUMENTS

CN 101673811 A 3/2010
CN 201430187 Y 3/2010
(Continued)

OTHER PUBLICATIONS

International Search Report of the International Searching Authority for International Application No. PCT/EP2011/003847 filed Aug. 1, 2011.
(Continued)

*Primary Examiner* — Patrick Ryan
*Assistant Examiner* — Jose Colucci Rios
(74) *Attorney, Agent, or Firm* — Boardman & Clark LLP

(57) ABSTRACT

The invention relates to an equipping station for equipping motor vehicle battery housings with sets of electrode plates for manufacturing a motor vehicle battery wherein the equipping station has at least one feed section for unequipped battery housings, at least one discharge station for equipped battery housings, at least one apparatus for feedings sets of electrode plates and at least one first equipping section, which is arranged between the feed section and the discharge section and in which sets of electrode plates which have been fed by means of the apparatus for feeding sets of electrode plates are inserted into the battery housing, wherein the first equipping section has a base part, wherein the base part is formed without a conveying apparatus for the battery housing, and the equipping station has at least one first extendable slide, via which a battery housing is horizontally displaceable.

11 Claims, 7 Drawing Sheets

(51) Int. Cl.
    B23P 19/00    (2006.01)
    B23P 19/04    (2006.01)
    B23P 21/00    (2006.01)
    H01M 10/12    (2006.01)

(52) U.S. Cl.
    CPC ............ *Y02E 60/126* (2013.01); *Y02T 10/7016* (2013.01); *Y10T 29/49108* (2015.01); *Y10T 29/53135* (2015.01)

(56) References Cited

U.S. PATENT DOCUMENTS

| | | | |
|---|---|---|---|
| 4,509,252 A * | 4/1985 | Sabatino et al. | 29/623.1 |
| 4,824,307 A * | 4/1989 | Johnson et al. | 414/798.2 |
| 5,046,917 A * | 9/1991 | Frey | 414/789.5 |
| 5,407,450 A * | 4/1995 | Rose et al. | 29/730 |
| 5,470,195 A * | 11/1995 | Blank et al. | 414/797 |
| 5,669,754 A * | 9/1997 | Croteau et al. | 414/801 |
| 2006/0051652 A1 * | 3/2006 | Samuels | 429/35 |
| 2008/0301930 A1 * | 12/2008 | Gallagher et al. | 29/740 |

FOREIGN PATENT DOCUMENTS

| | | |
|---|---|---|
| DE | 10028084 C1 | 12/2001 |
| DE | 102005058478 A1 | 6/2007 |
| DE | 202009011262 U1 | 1/2010 |
| WO | WO 2006/053353 A2 | 5/2006 |

OTHER PUBLICATIONS

International Preliminary Report on Patentability dated Feb. 14, 2013 for International Application No. PCT/EP2011/003847 and English translation of report.

* cited by examiner

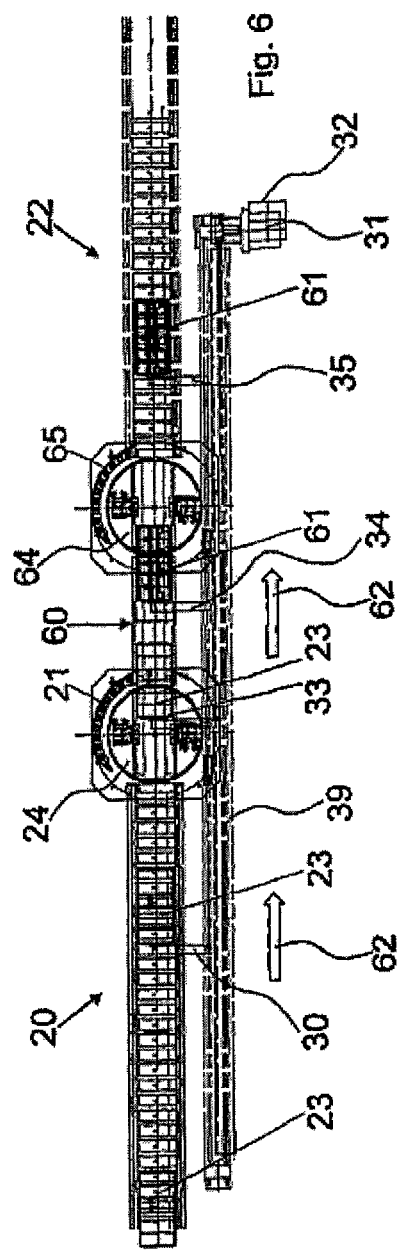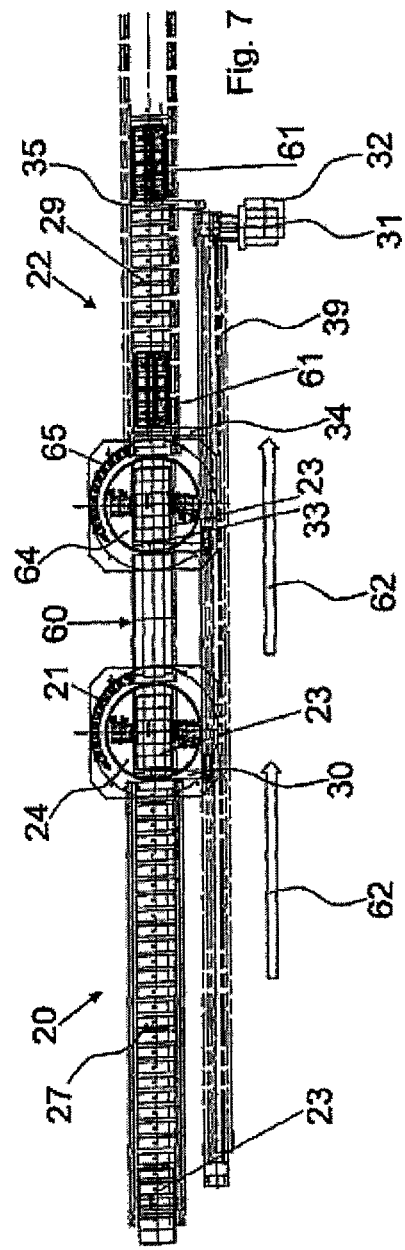

EQUIPPING MOTOR VEHICLE BATTERY HOUSINGS WITH SETS OF ELECTRODE PLATES

The invention relates to an equipping station for equipping motor vehicle battery housings with electrode plate sets in order to produce a motor vehicle battery, as per the preamble of claim 1. The invention also relates to an equipping plant having an equipping station of said type, as per claim 10, and to a method for equipping motor vehicle battery housings with electrode plate sets using an equipping station of said type, as per claim 11.

The invention relates generally to the field of equipping motor vehicle battery housings with electrode plate sets. The manufacture of motor vehicle batteries is nowadays highly automated for cost and safety reasons. To perform the various equipping steps, use is made of an equipping plant which generally has multiple equipping stations. Such an equipping plant is known for example from DE 20 2009 011 262 U1.

To optimize costs and the time required for the production of motor vehicle batteries, it is one aim to optimize the throughput of the equipping plant. In the operation of an equipping plant of said type, what is time-critical is in particular the final equipping step in which the electrode plate sets which have previously been prepared in the equipping plant are inserted into the motor vehicle battery housing. The insertion of the electrode plate sets is carried out with a considerable exertion of force, that is to say the electrode plate sets must be pressed into the individual chambers of the battery housing. This must on the one hand be carried out with high precision in order to prevent damage. On the other hand, short cycle times are desirable in order to attain a high throughput.

The invention is based on the object of specifying possibilities for the equipping of motor vehicle battery housings with electrode plate sets, which possibilities permit an increased output of finished product without any losses in production quality.

Said object is achieved by means of the invention specified in claims 1, 10 and 11. Advantageous refinements of the invention are specified in the subclaims.

Turning away from the teaching known from DE 20 2009 011 262 U1, in which, at the equipping station in said document, that is to say the processing station 4, there is arranged a conveyer belt for transporting battery housings, the invention proposes that the base part of the equipping station be formed without a conveying device for the battery housing. The equipping station has at least one first deployable slide by means of which a battery housing can be displaced horizontally at least on the base part, if appropriate overcoming the friction force that acts between the battery housing and the base part. To reduce the friction, freewheeling rollers or rails may also be provided. The required feed motion of the battery housing in the horizontal direction can hereby be imparted by the first deployable slide, which is the key to faster and more precise equipping of the battery housings and to the possibility of implementing further improvement measures which will be explained below.

The proposed deployable slide has the advantage that the feed motion of the battery housings can, by contrast to the situation with a conveyer belt, be realized in a slip-free manner, such that a precise movement of the battery housing and precise positioning at the desired location is made possible.

Specifically, a conveyer belt would not permit defined transportation of the battery housing. Furthermore, the elimination of a conveyer belt in the region of the base part has the advantage that it is possible to dispense with the cumbersome heavy-duty rollers that have hitherto been required; these were hitherto required owing to the intense vertical loading during the insertion of the electrode plate sets.

The deployable slide also makes it possible for a battery housing to be moved quickly, precisely and with care, because it is possible in particular for the slide to be moved at different feed speeds, for example in order to slowly approach a battery housing and, after contact is made with the battery housing, to move the latter forward quickly. An advantage here is that other battery housings on upstream or downstream conveyer belts are not influenced by this.

A further advantage of the use of deployable slides as conveying means is that for example two, three or four slides can be provided at certain distances from one another so as to permit a simultaneous displacement of multiple battery housings while the same distance is maintained between them. This creates new possibilities for the parallelized equipping of battery housings with electrode plate sets, for example by virtue of two or more equipping sections being provided in series in the equipping station and being able to have parts supplied to them in a precise manner. In this way, in the case of an equipping plant of the above-described type, the "bottleneck" of the production step for the insertion of the electrode plate sets into the battery housings can be eliminated through parallel manufacturing, and a higher throughput of batteries in the equipping plant can be attained overall.

The deployable slide may be implemented differently, for example in the form of an arm which is displaceable horizontally and transversely with respect to the battery conveying direction, in the form of a pivotable arm, in the form of a telescopic arrangement or as an arm operated via a four-bar linkage.

In one advantageous refinement of the invention, a second equipping section is provided in which a process of equipping battery housings with electrode plate sets can be performed simultaneously to a process of equipping battery housings with electrode plate sets in the first equipping section. The second equipping section is arranged between the first equipping section and the discharge section. Also provided is a second deployable slide which, as viewed in the displacement direction of the battery housings, is arranged at a distance, which is fixed at least during the operation of the equipping station, from the first deployable slide. The distance between the first and the second deployable slide may self-evidently be variable, that is to say adjustable, outside the operation of the equipping station in order to permit an adaptation of the equipping station to different types of battery housings. In one advantageous refinement of the invention, the distance between the first and the second deployable slide is equal to the distance between the equipping positions of the first and the second equipping section. An equipping position is to be understood to mean that position on the base part of the respective equipping section at which an unequipped battery housing is equipped with an electrode plate set by means of the electrode plate set supply device. The described arrangement of the first and the second slide permits a simultaneous parallel displacement of two battery housings from one supply section into the respective equipping position of the first and the second equipping section. Likewise, a parallel discharge of equipped battery housings from the first and the second equipping section in the discharge section is possible by means of the first and the second slide simultaneously.

In one advantageous refinement of the invention, a third and a fourth deployable slide are provided. Here, the first and the second deployable slide are used for displacing battery housings from the supply section to the first and the second equipping station. The third and the fourth deployable slide serve for displacing equipped battery housings from the first and the second equipping section into the discharge section. It is advantageously possible in this way to realize a simultaneous supply of unequipped battery housings and discharge of equipped battery housings, which saves a particularly large amount of time and which therefore permits particularly effective, throughput-increasing operation of the equipping plant.

The described principle may self-evidently also be extended to further deployable slides and further equipping sections in order to realize an even greater throughput of the equipping plant.

In one advantageous refinement of the invention, the first and/or the second deployable slide is designed for moving the battery housing from the supply section into the equipping section, from the equipping section into the discharge section, and/or for horizontally positioning a battery housing at least in the equipping section. As is apparent, the deployable slides according to the invention can be used in a multifunctional manner.

In one advantageous refinement of the invention, the first deployable slide is designed for displacing a battery housing from the supply section into the equipping section and a third deployable slide is designed for displacing an equipped battery housing from the equipping section into the discharge section.

In one advantageous refinement of the invention, the supply section and/or the discharge section have/has at least one conveyer belt. In the region of the conveyer belt there is provided at least one deployable stopper for stopping a battery housing in a defined manner in a desired position. It is advantageously also possible for multiple stoppers to be provided such that a plurality of battery housings can be held in certain desired positions. Pre-positioning or re-positioning of the battery housings outside the equipping section is possible in this way.

In one advantageous refinement of the invention, the base part is designed to be rotatable about the vertical axis of supplied battery housings. This advantageously makes it possible for battery housings to be, as it were, equipped in two manufacturing steps with in each case one half of the required electrode plate sets. In a first partial step, a first half of electrode plate sets may be inserted for example into even-numbered chambers of the battery housing. The battery housing is then rotated through 180°. Subsequently, in a second partial step, the second half of the electrode plate sets is inserted into odd-numbered chambers of the battery housing. The battery housing is thereafter fully equipped and can, if appropriate after a further rotation through 180°, be supplied to the discharge section.

In one advantageous refinement of the invention, the base part is connected to a circular rotary indexing table with a step size of 180°. This permits a simple and efficient rotation of battery housings on the base part through in each case 180°.

In one advantageous refinement of the invention, the equipping section has, in the region of the base part, at least one deployable clamping cylinder for fixing a battery housing between the clamping cylinder and a counter bearing or between the clamping cylinders. By means of a clamping cylinder of said type, it is possible for a battery housing to be held securely in the desired position in particular during the insertion of the electrode plate sets. The clamping cylinders are advantageously arranged outside the feed movement of the battery housings, for example with a deployment direction perpendicular to the displacement direction of the battery housings.

The invention also relates to an equipping plant for equipping and fitting out motor vehicle battery housings, having at least four processing stations which are arranged around a lifting/rotary table, wherein at a first processing station, unprocessed electrode plate sets are supplied and oriented with regard to their contact tabs and bent if appropriate, wherein at a second processing station, the contact tabs are provided with fluxing agent, galvanized and if appropriate provided with fluxing agent again, wherein at a third processing station, electrical connections between the electrode plates are produced by the casting-on of lead connections, and pole stems are cast on in a casting mold, and wherein a fourth processing station is designed according to one of the preceding claims, wherein the electrode plate sets can be guided by means of the lifting/rotary table from the first to the second, from the second to the third and from the third to the fourth processing station.

The invention also relates to a method for equipping motor vehicle battery housings with electrode plate sets using an equipping station of the type described above, wherein it is provided in the method that the first deployable slide is initially, in the retracted state, positioned relative to a battery housing to be displaced, the slide is then deployed and moved at low speed until it makes contact with a battery housing, is then moved at higher speed in a horizontal displacement direction of the battery housing, and is stopped, and if appropriate then retracted, after the desired position of the battery housing is reached.

The invention will be explained in more detail below on the basis of exemplary embodiments and with reference to drawings, in which:

FIGS. 6 to 8 show a further embodiment of an equipping station in a plan view.

In the figures, corresponding elements are denoted by the same reference numerals.

Figure 1:
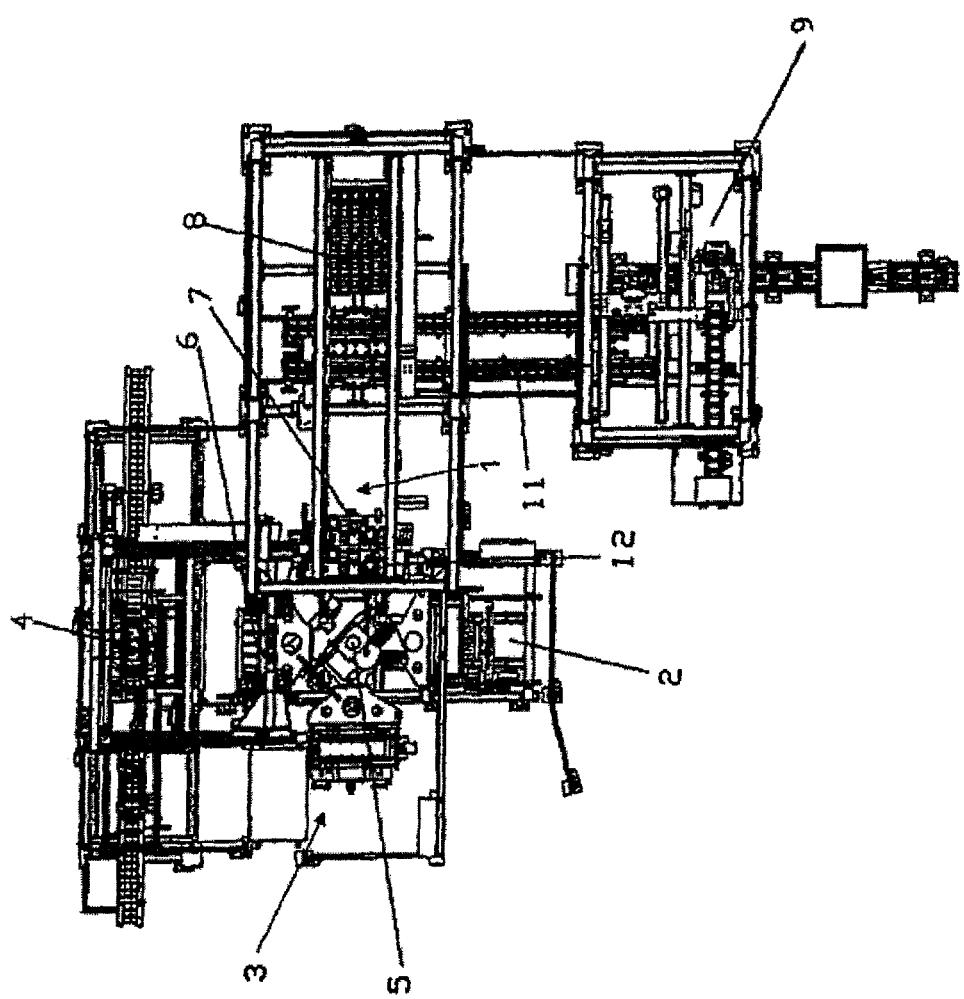
FIG. 1 shows an equipping plant.

FIG. 1 shows, in a plan view, that is to say in a bird's-eye view, an equipping plant for equipping and fitting out motor vehicle battery housings, having four processing stations 1, 2, 3, 4 which are arranged around a lifting/rotary table 5. The lifting/rotary table 5 serves inter alia for conveying the semi-finished parts processed at the processing stations from one processing station to the next. Positioned upstream of the first processing station 1 is a supply station for battery plate packs, which are arranged in clamping cassettes 6. The supply station has inter alia a supply belt 9, a buffer belt 8 and a six-unit gripper 7. The six-unit gripper 7 serves for simultaneously gripping a multiplicity of supplied battery plate packs. Also provided is a second supply belt 11. The supplied battery plate packs are prepared in succession in the processing stations 1, 2 and 3 in the manner known from DE 20 2009 011 262 U1 and are then supplied via the lifting/rotary table 5 to an electrode plate set supply device which, in the final processing station 4, serves for inserting the electrode plate sets into unequipped battery housings. The function of the equipping station 4 will be described below on the basis of the further figures.

Figure 2:
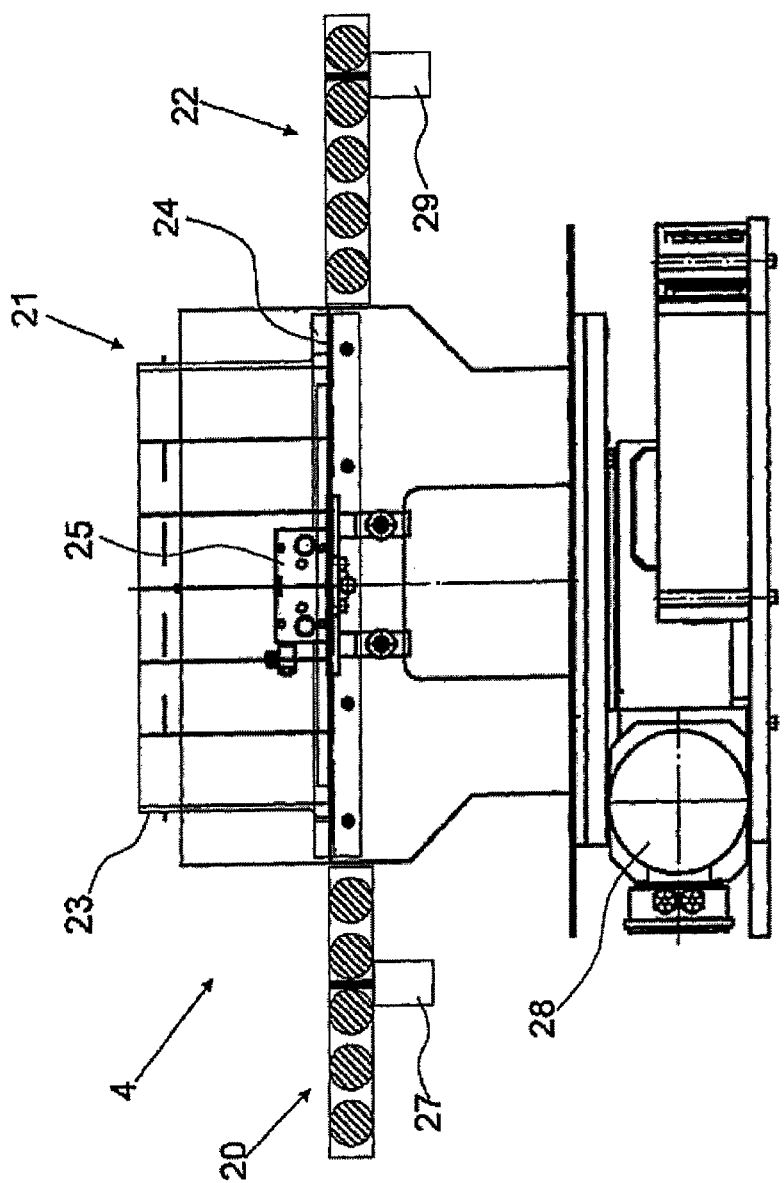
FIG. 2 shows an equipping station in a side view.

FIG. 2 shows a first embodiment of the equipping station 4 in a side view. The feed direction of battery housings runs from left to right in the illustration of FIG. 2. The equipping station 4 has a supply section 20 which has a roller-type conveyer belt, an equipping section 21, and a discharge section 22 which likewise has a roller-type conveyer belt. As can be seen, the equipping section 21 is arranged between the supply section 20 and the discharge section 22. The equipping section 21 has a base part 24 which can be rotated about the vertical axis by means of a rotary drive 28. Also shown is an unequipped battery housing 23 which is situated on the base part 21. The illustration also shows a deployable clamping cylinder 25. For simplicity of the illustration, FIG. 2 does not illustrate a deployable slide and the mechanism connected thereto.

FIG. 2 also shows a first deployable stopper 27, which is provided in the supply section 20, and a second deployable stopper 29, which is provided in the discharge section 22. The deployable stoppers serve for stopping a battery housing in a desired position. The deployable stoppers may for example take the form of pneumatic cylinders.

Figure 3:
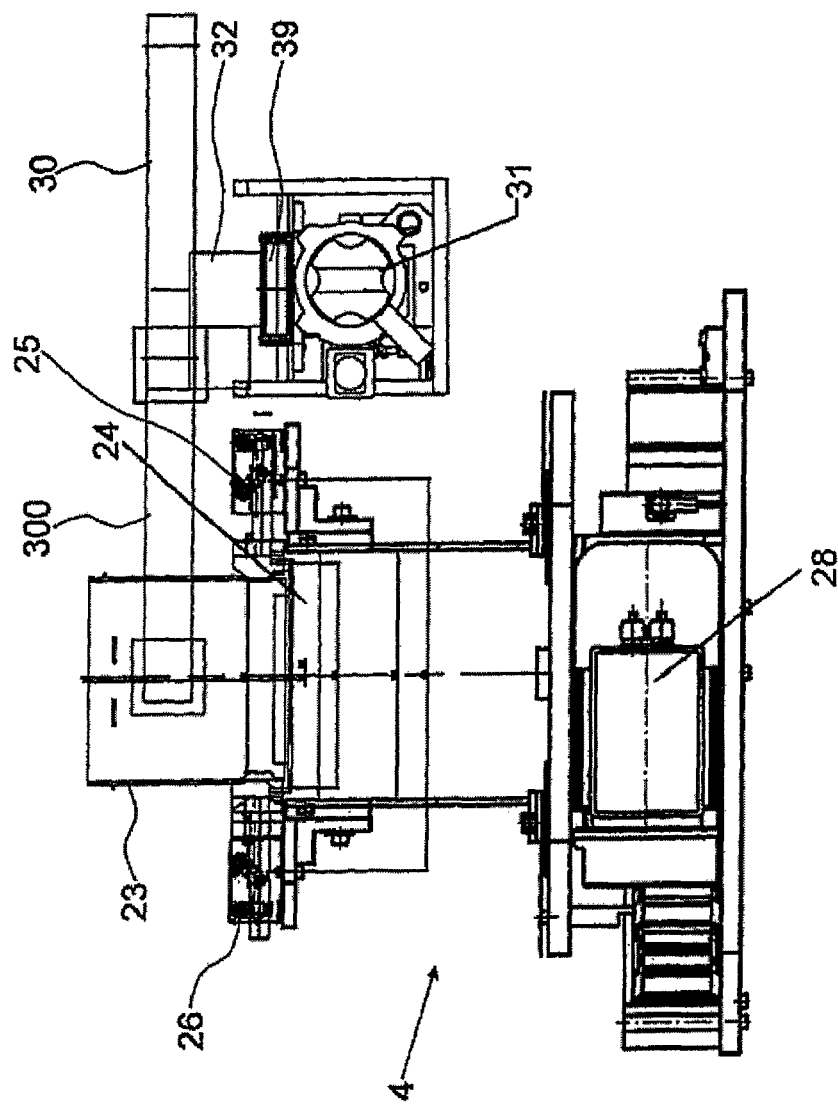
FIGS. 3 to 5 show an equipping station in a front view.

FIG. 3 shows the equipping station 4 as per FIG. 2 in a frontal view, that is to say in a view from the left in relation to the illustration of FIG. 2. By contrast to FIG. 2, it is additionally possible to see a second deployable clamping cylinder 26. The clamping cylinders 25, 26 are arranged on opposite sides of the battery housing 23 and, in FIG. 3, are illustrated in the deployed position in which the battery housing 23 is fixed between the clamping cylinders 25, 26. It is also possible for only one of the clamping cylinders to be deployed for the purpose of fixing the battery housing. The other clamping cylinder then serves as a counter bearing. The deployable clamping cylinders 25, 26 may for example have pneumatic cylinders.

FIG. 3 additionally shows a displacement mechanism having a first deployable slide 30 which can be moved horizontally to the left and to the right, in the plane of the paper, so to speak, by means of a linear drive 32. The first deployable slide 30 is, for illustration, additionally illustrated in the deployed position, as denoted by the reference numeral 300. A positioning drive 31 is provided for moving the first deployable slide in the displacement direction of the battery housing, that is to say perpendicular to the plane of the paper in the illustration of FIG. 3.

Figure 4:
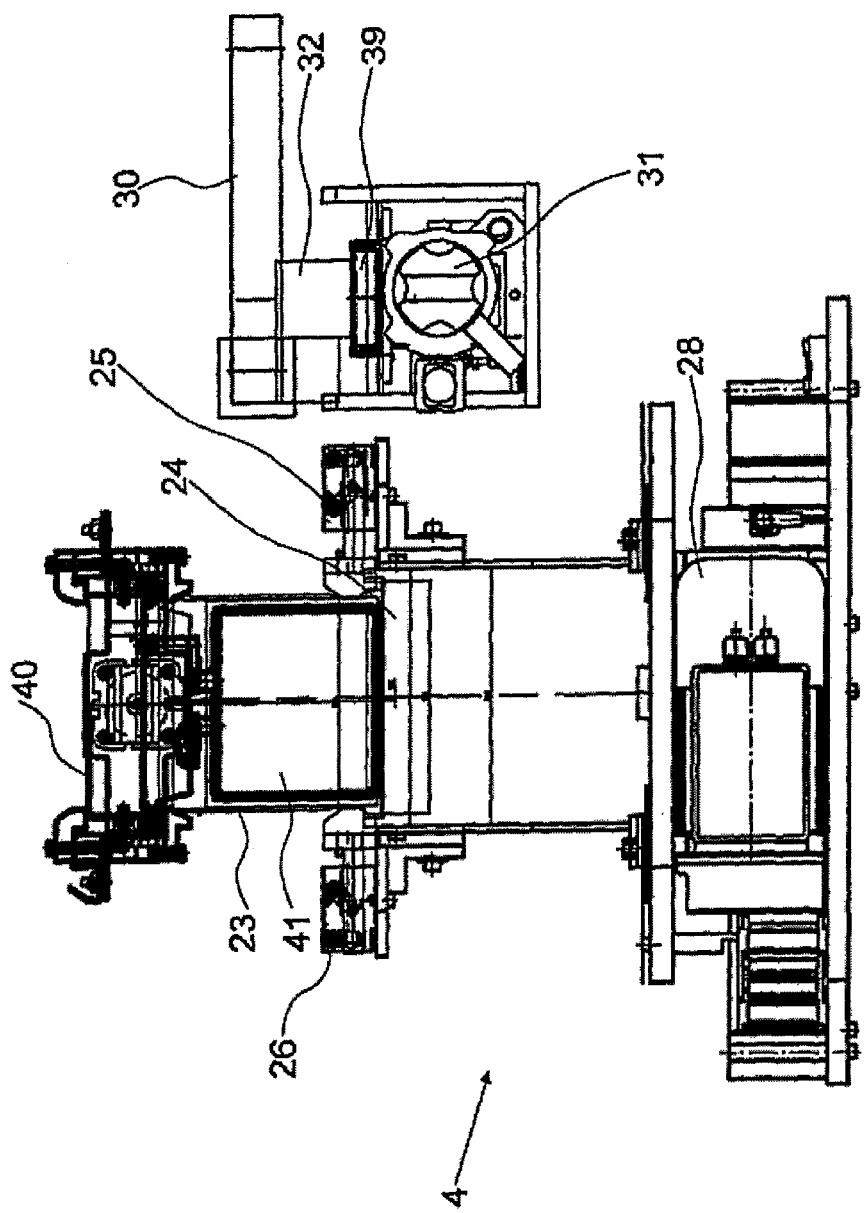

FIG. 4 shows the equipping station 4 as per FIGS. 2 and 3 in the same view as in FIG. 3. As can be seen, the deployable slide 30 is illustrated in the retracted position. It is also possible to see an electrode plate set supply device 40 which has been pivoted from above onto an unequipped battery housing 23. Said electrode plate set supply device 40 inserts electrode plate sets 41 into the battery housing 23, as shown in FIG. 4.

Figure 5:
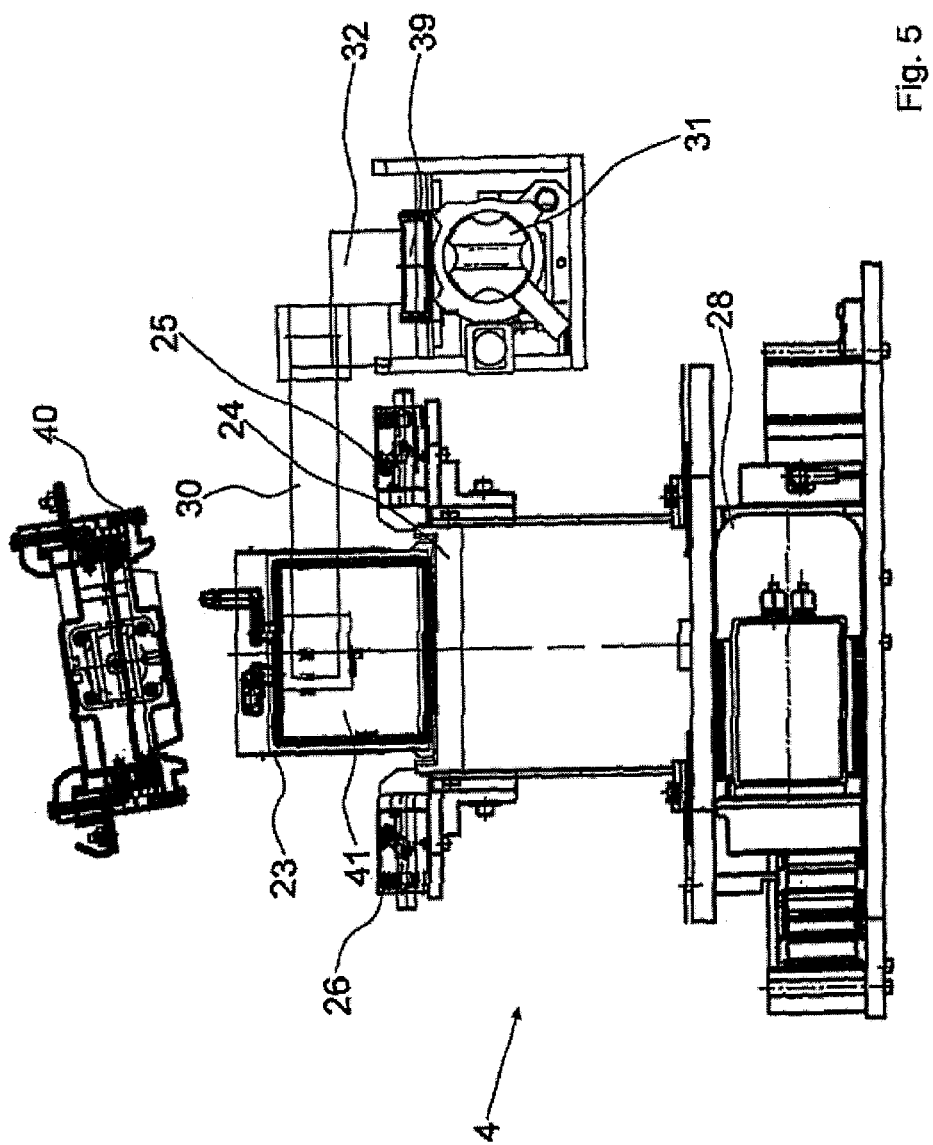

FIG. 5 shows the equipping station 4 as per FIG. 4 in a subsequent processing step in which the electrode plate set supply device 40 is removed again. The battery housing 23 is now fully equipped with electrode plate sets 41. Correspondingly, the first deployable slide 30 has now been deployed by actuation of the linear drive 32. Then, by actuation of the positioning drive 31, the equipped battery housing 32 can be displaced from the equipping section 21 into the discharge section 22.

FIG. 6 shows a further embodiment of an equipping station 4, again in a plan view. FIG. 6 shows a second equipping section 65 in addition to a first equipping section 21. The second equipping section 65 is arranged between the first equipping section 21 and the discharge section 22. Between the first and the second equipping section 21, 65 there is provided a transfer section 60 which may be formed for example as a metal plate. The transfer section 60 can be produced in a very simple manner and in particular does not require a dedicated conveying device for the battery housing.

As can be seen, the displacement mechanism is formed with four deployable slides 30, 33, 34, 35 which are arranged along a chain drive 39. The chain drive 39 is operated by means of the positioning drive 31, such that the slides 30, 33, 34, 35 can be moved in the displacement direction 62 of the battery housing and back. The slides 30, 33, 34, 35 can additionally be retracted and deployed by means of the linear drive 32.

FIG. 6 shows, by way of example, two unequipped battery housings 23 in the supply section 20 and an unequipped battery housing 23 at the transition from the first equipping section 21 to the transfer section 60. Two already equipped battery housings 61 are also illustrated. By actuation of the slides 30, 33, 34, 35 in the displacement direction 62 of the battery housings, the battery housings 23, 61 bearing against the corresponding slides are displaced simultaneously, with the same distance being maintained between them. Here, the unequipped battery housings 23 are positioned at the desired position in the first and the second equipping section 21, 65. At the same time, the equipped battery housings are discharged into the discharge section 22.

FIG. 7 shows the equipping station 4 as per FIG. 6 at a time, subsequent to the time illustrated in FIG. 6, at which time the unequipped battery housings 23 are positioned in the first and the second equipping section 21, 65 at the desired location. Furthermore, the equipped battery housings 61 are situated in the discharge section 22.

Figure 8:
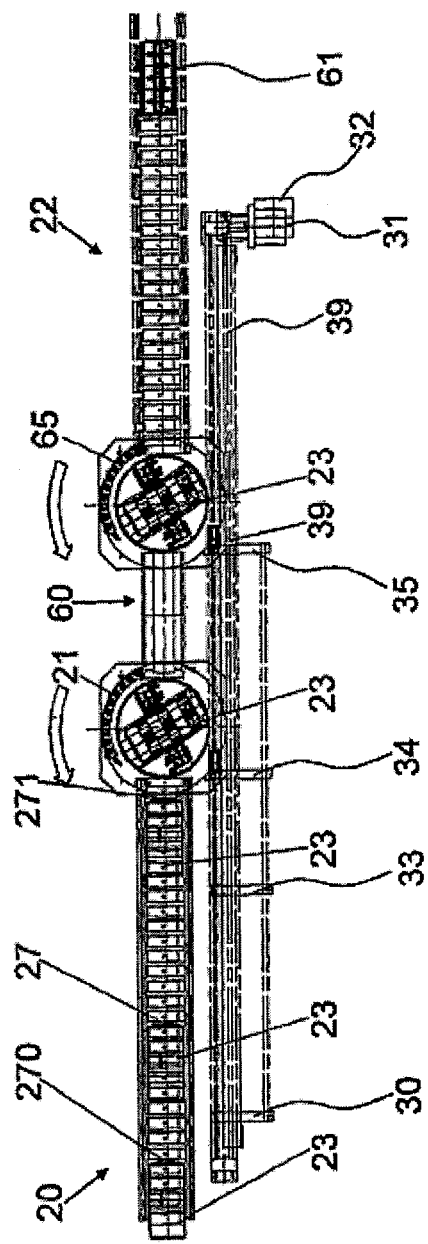

FIG. 8 shows the equipping station as per FIGS. 6 and 7, wherein the illustration additionally shows how half-equipped battery housings 23 are rotated, by means of vertically rotatable base parts 24, 64 of the first and the second equipping station 21, 65, into a position in which the second halves of the required electrode plate sets are inserted into the battery housings. FIG. 8 also shows further deployable stoppers 270, 271 in the region of the supply section 20.

As can be seen, the principle according to the invention is suitable both for a single plant having only one equipping section and also for multiple plants having multiple equipping sections. The described slide principle is also suitable for equipping plants in which the battery housings are fully equipped in one step, that is to say plants in which no rotatable base part is provided.

As a conveyer belt in the supply section or in the discharge section, use may be made of for example a roller-type conveyer belt, a plastic link belt, a hinged steel belt, a web belt or similar conveying means. The use of roller-type belts is advantageous if battery housings which are particularly susceptible to scratches are to be equipped. In the case of roller-type belts, deployable stoppers may advantageously be arranged between the rollers.

As a drive for the rotary mechanism of the base part of an equipping section, use may be made of for example a circular rotary indexing table with a step size of 180°, in particular a circular rotary indexing table which is rotatable in both directions of rotation. Other drives for the rotary mechanism may also be provided, such as for example a geared motor, a servo motor or a pneumatic drive.

Owing to different battery lengths to be manufactured in the equipping plant, the positioning drive 31 is capable of permitting movements to different positions depending on the battery type. For movement to a defined position, it is for example possible for a servo motor with position regulation to be provided.

The equipping station 4 described on the basis of FIGS. 6 to 8 can be operated for example as follows.

Two battery housings are fully equipped on the base plates 24, 64 of the equipping stations 21, 65 and are set into a desired discharge position by means of the vertical rotary mechanism. Two unequipped battery housings 23 are already situated in two provision spaces in the supply section 20. The drive of the conveyer belt of the supply device 20 is initially deactivated. The stoppers 27, 270, 271 of the unequipped battery housings are then lowered, such that the battery housings are released. Furthermore, the clamping cylinders in the equipping sections 21, 65 are retracted again, whereby the two fully equipped battery housings 61 present in the equipping stations 21, 65 are released. At this time, the drive of the conveyer belt of the discharge section 22 is deactivated. In this region, the stoppers have furthermore been lowered, such that the passage for battery housings is opened up.

The four slides 30, 33, 34, 35 then move in the displacement direction 62 until they bear against the rear ends of the battery housings. In said region of a few millimeters before the battery housings, the slides 30, 33, 35, 36 are moved at creep speed, that is to say at very low feed speed, in the movement direction 62. Only when contact is made with the battery housings are the slides moved at slightly increased speed in the displacement direction 62. Here, the equipped battery housings are pushed onto the still-stationary conveyer belt of the discharge section 22, specifically over the lowered stopper. Here, the rear equipped battery housing in this case comes to a standstill before reaching a lowered stopper.

The slides are then retracted and moved counter to the displacement direction 62. At the same time, the stoppers in the discharge section 22 are raised into their stop position. The drive of the conveyer belt in the discharge section 22 is activated. As a result, the front equipped battery housing is conveyed onward in the direction of the exit of the equipping plant. The other equipped battery housing runs forward as far as the stopper. When the front equipped battery housing has passed an exit light barrier, the stopper is lowered. As a result, the second equipped battery housing also runs in the direction of the exit of the equipping plant. After the exit light barrier is passed, the drive of the conveyer belt of the discharge section is stopped.

The unequipped battery housings which, in the process, have already simultaneously been displaced into the equipping sections 21, 65 are oriented and fixed by the clamping cylinders. The unequipped battery housings are then equipped with electrode plate sets by means of the electrode plate set supply device. From above there is lowered an introduction frame which ultimately engages into the chambers of the battery housing. The battery housing is positioned in the correct position by the spreading of infixing plates. The battery housing is subsequently fixed by the clamping cylinders. The two battery housings are equipped with in each case three electrode plate sets. The electrode plate set supply device is subsequently raised, the battery housings are rotated counterclockwise through 180° by the rotatable base plates, and the electrode plate sets that are still missing are then inserted into the battery housing by means of the electrode plate set supply device. The electrode plate set supply device is subsequently raised again, and the battery housing is rotated back clockwise through 180°.

In the supply section 20, the supplied unequipped battery housings are likewise stopped by means of the deployable stoppers. The conveyer belt of the supply section 20 conveys the battery housings initially as far as a stopper close to the equipping station 21. If said position is already occupied by a battery housing, a second stopper situated upstream in the displacement direction 62 is deployed, said second stopper stopping a second unequipped battery housing in a desired position. The drive of the conveyer belt of the supply section 20 can hereafter be deactivated.

A new manufacturing cycle can hereafter commence from the beginning.

The described equipping station 4 as per FIGS. 6 to 8 may alternatively also be operated as follows.

By means of the deployable slides 30, 33, 34, 35, the battery housings are in each case moved only step by step from the supply section 20 into the first equipping section 21 and then into the second equipping section 65 and finally into the discharge section 22. Therefore, battery housings are not moved into and out of the two equipping sections 21, 65 in pairs, but rather each battery housing is pushed into each of the equipping sections 21, 65 and partially equipped there in each case. Here, a first part of the electrode plate sets is inserted into the battery housing in the first equipping section 21, for example by virtue of the even-numbered chambers of the battery housing being equipped. In the second equipping section, the second half of the electrode plate sets are inserted into the already half-equipped battery housing, for example by virtue of the odd-numbered chambers of the battery housing being equipped. Correspondingly, the electrode plate set supply device of the second equipping section 65 is set up differently than the electrode plate set supply device of the first equipping section 21, in such a way that one equips the even-numbered chambers and the other equips the odd-numbered chambers of the battery housings. This mode of operation of the equipping station has the advantage that the equipping sections 21, 65 are of structurally simpler design, and in particular, no rotatable base part 24, 64 is required. Furthermore, an acceleration of the equipping of the battery housing is achieved because the steps of rotating the battery housings about the vertical axis can be omitted.

The invention claimed is:

1. An equipping station for equipping motor vehicle battery housings with electrode plate sets in order to produce a motor vehicle battery, wherein the equipping station has at least one supply section for unequipped battery housings, at least one discharge section for equipped battery housings, at least one fully assembled electrode plate set supply device, and at least one first equipping section having at least one first slide which is arranged between the supply section and the discharge section and in which fully assembled electrode plate sets supplied by means of the electrode plate set supply device are inserted into the battery housing, wherein the supply section comprises a first conveyer belt and the discharge section comprises a second conveyer belt, and wherein the first equipping section has a base part which serves as a support surface for the battery housing during the insertion process of the electrode plate sets, characterized in that the base part is formed without a conveying device for the battery housing and wherein the equipping station has at least one first slide which is retractable and deployable transversely with respect to a horizontal displacement direction by actuation of a linear drive of the battery housing and by means of which a battery housing is, when the first slide is in the deployed state, displaceable horizontally at least on the base part by actuation of a positioning drive.

2. The equipping station as claimed in claim 1, characterized in that a second equipping section is provided in which a process of equipping battery housings with electrode plate sets can be performed simultaneously to a process of equipping battery housings with electrode plate sets in the first equipping section, wherein the second equipping section is arranged between the first equipping section and the discharge section, and a second deployable slide is provided which, as viewed in the displacement direction of the battery housings, is arranged at a distance, which is fixed at least during the operation of the equipping station, from the first deployable slide.

3. The equipping station as claimed in claim 2, characterized in that the distance between the first and the second deployable slide is equal to the distance between the equipping positions of the first and the second equipping section.

4. The equipping station as claimed in claim 2, characterized in that the first and/or the second deployable slide is designed for moving the battery housing from the supply section into the equipping section, from the equipping section into the discharge section, and/or for horizontally positioning a battery housing at least in the equipping section.

5. The equipping station as claimed in claim 1, characterized in that the supply section and/or the discharge section have/has at least one conveyer belt, and in the region of the conveyer belt there is provided at least one deployable stopper for stopping a battery housing in a defined manner in a desired position.

6. The equipping station as claimed in claim 1, characterized in that the base part is designed to be rotatable about the vertical axis of supplied battery housings.

7. The equipping station as claimed in claim 6, characterized in that the base part is connected to a circular rotary indexing table with a step size of 180°.

8. The equipping station as claimed in claim 2, characterized in that the first deployable slide is designed for moving a battery housing from the supply section into the first equipping section, and a third deployable slide is designed for moving an equipped battery housing from the first equipping section into the discharge section.

9. The equipping station as claimed in claim 2, characterized in that the first and/or the second equipping section has, in the region of the base part, at least one deployable clamping cylinder for fixing a battery housing between the clamping cylinder and a counter bearing or between the clamping cylinders.

10. An equipping plant for equipping and fitting out motor vehicle battery housings, having at least four processing stations which are arranged around a lifting/rotary table, wherein at a first processing station, unprocessed electrode plate sets are supplied and oriented with regard to their contact tabs and bent if appropriate, wherein at a second processing station, the contact tabs are provided with fluxing agent, galvanized and if appropriate provided with fluxing agent again, wherein at a third processing station, electrical connections between the electrode plates are produced by the casting-on of lead connections, and pole legs are cast on in a casting mold, and wherein a fourth processing station is designed as an equipping station for equipping motor vehicle battery housings with electrode plate sets in order to produce a motor vehicle battery, wherein the equipping station has at least one supply section for unequipped battery housings, at least one discharge section for equipped battery housings, wherein the supply section comprises a first conveyer belt and the discharge section comprises a second conveyer belt, at least one electrode plate set supply device, and at least one first equipping section which is arranged between the supply section and the discharge section and in which electrode plate sets supplied by means of the electrode plate set supply device are inserted into the battery housing, wherein the first equipping section has a base part which serves as a support surface for the battery housing during the insertion process of the electrode plate sets, characterized in that the base part is formed without a conveying device for the battery housing and the equipping station has at least one first slide which can be retracted and deployed transversely with respect to a horizontal displacement direction of the battery housing by actuation of a linear drive and by means of which a battery housing can, when the first slide is in the deployed state, be displaced horizontally at least on the base part by actuation of a positioning drive, and wherein the electrode plate sets can be guided by means of the lifting/rotary table from the first to the second, from the second to the third and from the third to the fourth processing station.

11. A method for equipping motor vehicle battery housings with electrode plate sets using an equipping station for equipping motor vehicle battery housings with electrode plate sets in order to produce a motor vehicle battery, wherein the equipping station has at least one supply section for unequipped battery housings, wherein the supply section comprises a first conveyer belt and the discharge section comprises a second conveyer belt, at least one discharge section for equipped battery housings, at least one electrode plate set supply device, and at least one first equipping section which is arranged between the supply section and the discharge section and in which electrode plate sets supplied by means of the electrode plate set supply device are inserted into the battery housing, wherein the first equipping section has a base part which serves as a support surface for the battery housing during the insertion process of the electrode plate sets, characterized in that the base part is formed without a conveying device for the battery housing and the equipping station has at least one first slide which can be retracted and deployed transversely with respect to a horizontal displacement direction of the battery housing by actuation of a linear drive and by means of which a battery housing can, when the first slide is in the deployed state, be displaced horizontally at least on the base part by actuation of a positioning drive, wherein the first deployable slide is initially, in the retracted state, positioned relative to a battery housing to be displaced, the slide is then deployed and moved at low speed until it makes contact with a battery housing, is then moved at higher speed in a horizontal displacement direction of the battery housing, and is stopped after the desired position of the battery housing is reached.

* * * * *